United States Patent
Lakkis et al.

(10) Patent No.: US 7,190,722 B2
(45) Date of Patent: Mar. 13, 2007

(54) ULTRA-WIDEBAND PULSE MODULATION SYSTEM AND METHOD

(75) Inventors: Ismail Lakkis, San Diego, CA (US); Yasaman Bahreini, La Jolla, CA (US)

(73) Assignee: Pulse-Link, Inc., Carlsbad, CA (US)

( * ) Notice: Subject to any disclaimer, the term of this patent is extended or adjusted under 35 U.S.C. 154(b) by 747 days.

(21) Appl. No.: 10/425,936

(22) Filed: Apr. 28, 2003

(65) Prior Publication Data

US 2004/0174924 A1    Sep. 9, 2004

Related U.S. Application Data

(60) Provisional application No. 60/452,020, filed on Mar. 3, 2003.

(51) Int. Cl.
*H03K 7/08* (2006.01)

(52) U.S. Cl. .................. 375/238; 375/239; 341/57

(58) Field of Classification Search ............ 375/238, 375/239; 370/212, 213
See application file for complete search history.

(56) References Cited

U.S. PATENT DOCUMENTS

| | | | |
|---|---|---|---|
| 3,668,639 A | 6/1972 | Harmuth | |
| 3,678,204 A | 7/1972 | Harmuth | |
| 3,728,632 A | 4/1973 | Ross | |
| 4,641,317 A | 2/1987 | Fullerton | |
| 4,979,186 A | 12/1990 | Fullerton | |
| 5,117,441 A * | 5/1992 | Weigand | 375/336 |
| 5,146,616 A | 9/1992 | Tang et al. | |
| 5,363,108 A | 11/1994 | Fullerton | |
| 5,677,927 A | 10/1997 | Fullerton et al. | |
| 5,687,169 A | 11/1997 | Fullerton | |

(Continued)

FOREIGN PATENT DOCUMENTS

WO    WO 01/39451 A1    5/2001

(Continued)

OTHER PUBLICATIONS

I Wu, Predrag Spasojevic, Ivan Seskar, "Multipath Beamforming UWB Signal Design Based on Ternary Sequences", 40th Annual Allerton Conference, Aug. 26, 2002, WINLAB, Rutgers University, Camden, New Jersey, USA.

(Continued)

*Primary Examiner*—Kevin Kim
(74) *Attorney, Agent, or Firm*—Pulse-Link, Inc; Peter Martinez

(57) ABSTRACT

An ultra-wideband pulse modulation system and method is provided. One method of the present invention includes transforming data into a ternary data set with data being represented with states of zero, positive one and negative one. The modulation and pulse transmission method of the present invention enables the simultaneous coexistence of the ultra-wideband pulses with conventional carrier-wave signals. The present invention may be used in wireless and wired communication networks such as hybrid fiber-coax networks. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

32 Claims, 9 Drawing Sheets

U.S. PATENT DOCUMENTS

| | | | |
|---|---|---|---|
| 5,748,891 | A | 5/1998 | Fleming et al. |
| 5,920,278 | A | 7/1999 | Tyler et al. |
| 6,002,708 | A | 12/1999 | Fleming et al. |
| 6,026,125 | A | 2/2000 | Larrick, Jr. et al. |
| 6,031,862 | A | 2/2000 | Fullerton et al. |
| 6,178,217 | B1 | 1/2001 | Defries et al. |
| 6,275,544 | B1 | 8/2001 | Aiello et al. |
| 6,281,784 | B1 | 8/2001 | Redgate et al. |
| 6,505,032 | B1 | 1/2003 | McCorkle et al. |
| 6,539,213 | B1 | 3/2003 | Richards et al. |
| 6,728,306 | B1* | 4/2004 | Shi .......................... 375/149 |
| 2001/0033610 | A1 | 10/2001 | Chastain |
| 2002/0075972 | A1 | 6/2002 | Richards et al. |
| 2002/0076193 | A1 | 6/2002 | Melick et al. |
| 2002/0080889 | A1* | 6/2002 | Dress et al. ................. 375/295 |

FOREIGN PATENT DOCUMENTS

| | | |
|---|---|---|
| WO | WO 01/93434 A2 | 12/2001 |
| WO | WO 02/31986 A2 | 4/2002 |

OTHER PUBLICATIONS

Henning F. Harmuth, "Applications of Walsh functions in communications", IEEE Spectrum, Nov. 1969, pp. 82-91, USA.

Robert Fleming, Cherie Kusher, "Integrated, Low-Power, Ultra-Wideband Transceivers for Distributed Position Location and Communication", Semi-Annual Technical Report Contract J-BFI-94-058, Aether Wire & Location, Inc. Jul. 1995, Nicasio, CA, USA.

Robert Fleming, Cherie Kusher, "Low-Power, Miniature, Distrubuted Position Location and Communication Devices Using Ultra-Wideband, Nonsinusoidal Communication Technology", Semi-Annual Technical Report Contract J-BFI-94-058, Aether Wire & Location, Inc. Jul. 1995, Nicasio, CA, USA.

Fernando Ramirez-Mireles, Robert A. Scholtz, "N-Orthogonal Time-Shift-Modulated Codes for Impulse Radio", Report from Joint Services Electronics Program Contract F 49620-94-0022, CTMC 1997, IEEE Wireless 98, Jul. 1998, USA.

Fernando Ramirez-Mirales, "On Performance of Ultra Wideband Signals in Gaussian Noise and Dense Multipath", Paper 99C265, Accepted for Publication in the IEEE Transactions on Vehicular Technology, USC Ultralab, USA.

Robert A. Scholtz, P. Vijay Kumar, Carlos J. Corrada-Bravo, "Signal Design for Ultra-wideband Radio", Department of Electrical Engineering, University of Southern California, Los Angeles, CA, USA.

Moe Z. Win, Zoran A. Kostic, "Impact of Spreading Bandwidth on Rake Reception in Dense Multipath Channels", IEEE Journal on Selected Areas on Communications, vol. 17, No. 10, pp. 1794-1806, Oct. 1999, USA.

Moe Z. Win, George Chrisikos, Nelson R. Sollenberger, "Performance of Rake Reception in Dense multipath Channels: Implications of Spreading Bandwidth and Selection Diversity Order", IEEE Journal on Selected Areas on Communications, vol. 18, No. 8, pp. 1516-1525, Aug. 2000, USA.

Henning F. Harmuth, "Frequency-Sharing and Spread-Spectrum Transmission with Large Relative Bandwidth", IEEE Transactions on Electromagnetic Compatibility, vol. EMC-20, No. 1, Feb. 1978, USA.

Multispectral Solutions, Inc., "Revision of Part 15 of the Commission's Rules Regarding Ultra-Wideband Transmission Systems" Sep. 12, 2000.

Anna Scaglione, "Differential Direct Sequence Spread Spectrum for Ultra-Wideband Low power Wireless Microsystems", University of New Mexico, Dept. of EECE, Albuquerque, NM, USA.

* cited by examiner

ULTRA-WIDEBAND PULSE MODULATION SYSTEM AND METHOD

Priority is claimed to a U.S. Provisional Application, Ser. No. 60/452,020, filed Mar. 3, 2003, titled: "Ultra-Wideband Pulse Modulation System and Method," which is referred to and incorporated herein in its entirety by this reference.

FIELD OF THE INVENTION

The present invention generally relates to ultra-wideband communications. More particularly, the invention concerns a method of modulating ultra-wideband pulses for wire and wireless communications.

BACKGROUND OF THE INVENTION

The Information Age is upon us. Access to vast quantities of information through a variety of different communication systems are changing the way people work, entertain themselves, and communicate with each other. For example, as a result of increased telecommunications competition mapped out by Congress in the 1996 Telecommunications Reform Act, traditional cable television program providers have evolved into full-service providers of advanced video, voice and data services for homes and businesses. A number of competing cable companies now offer cable systems that deliver all of the just-described services via a single broadband network.

These services have increased the need for bandwidth, which is the amount of data transmitted or received per unit time. More bandwidth has become increasingly important, as the size of data transmissions has continually grown. Applications such as movies-on-demand and video teleconferencing demand high data transmission rates. Another example is interactive video in homes and offices. Moreover, traffic across the Internet continues to increase, and with the introduction of new applications, such as the convergence of voice and Internet data, traffic will only increase at a faster rate. Consequently, carriers and service providers are overhauling the entire network infrastructure—including switches, routers, backbone, and the last mile (i.e., the local loop)—in an effort to provide more bandwidth.

Other industries are also placing bandwidth demands on Internet service providers, and other data providers. For example, hospitals transmit images of X-rays and CAT scans to remotely located physicians. Such transmissions require significant bandwidth to transmit the large data files in a reasonable amount of time. The need for more bandwidth is evidenced by user complaints of slow Internet access and dropped data links that are symptomatic of network overload.

Therefore, there exists a need for a method to increase the bandwidth of wired network or communication system, as well as a wireless network or communication system.

SUMMARY OF THE INVENTION

The present invention provides a method of modulating an ultra-wideband (UWB) signal comprised of a multiplicity of UWB pulses. The pulse can be transmitted and received wirelessly, or through any wire medium, whether the medium is twisted-pair wire, coaxial cable, fiber optic cable, or other types of wire media.

One embodiment of the present invention provides an UWB pulse modulation method that increases the available bandwidth of a communication system by enabling the simultaneous transmission of conventional carrier-wave signals and ultra-wideband pulses. The method includes transforming the data into a ternary data set with data being represented with states of zero, positive one and negative one. The modulation and pulse transmission method of the present invention enables the simultaneous coexistence of the ultra-wideband pulses with conventional carrier-wave signals. The present invention may be used in wireless and wired communication networks such as hybrid fiber-coax networks.

In one embodiment of the present invention, data is transformed so that it will always include a zero in every pair of transmitted data bits. Zeros in the modulation technique of the present invention are represented by the absence of electromagnetic energy. Therefore, by ensuring a zero in every pair of transmitted data bits, the average energy transmitted into the radio frequency spectrum is reduced. This reduces the possibility of interfering with other signals, and alternatively, in another embodiment of the present invention, may allow the power of each ultra-wideband pulse to be increased.

One feature of the present invention is that the transmitted ultra-wideband pulses have a spectral power density that does not cause interference with other communication signals.

Thus, the ultra-wideband pulses transmitted according to the methods of the present invention enable a significant increase in the bandwidth, or data rates of a communication system.

These and other features and advantages of the present invention will be appreciated from review of the following detailed description of the invention, along with the accompanying figures in which like reference numerals refer to like parts throughout.

Figure 1:
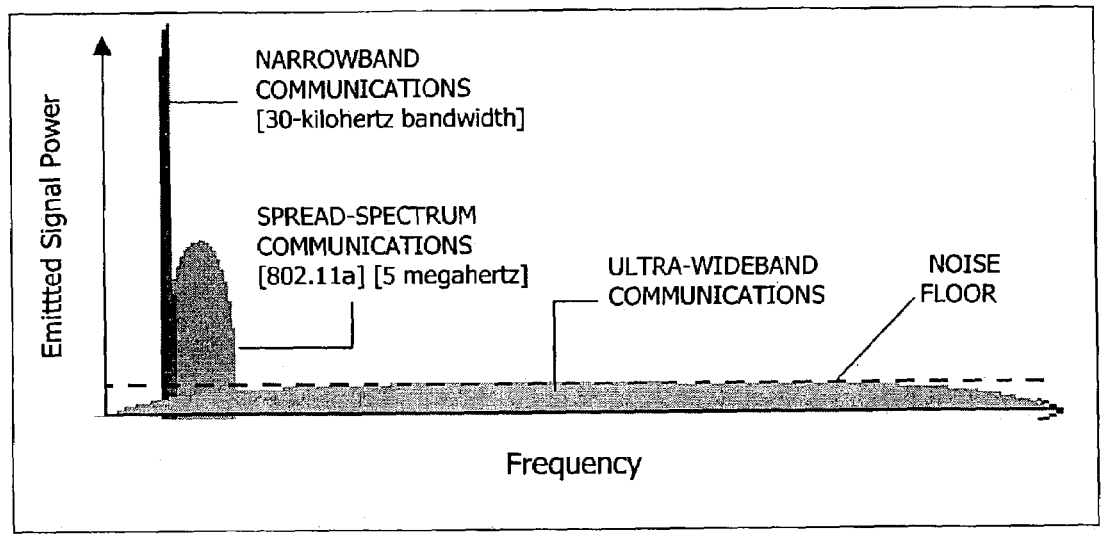
FIG. 1 is an illustration of different communication methods.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention provides a method of modulating an ultra-wideband signal comprised of a plurality of ultra-wideband pulses. The pulses can be transmitted and received wirelessly, or through any wire medium, whether the medium is twisted-pair wire, coaxial cable, fiber optic cable, or other types of wire media.

One embodiment of the present invention provides a pulse modulation method that increases the available bandwidth of a communication system by enabling the simultaneous transmission of conventional carrier-wave signals and ultra-wideband pulses. The method includes transforming the data into a ternary data set with data being represented with states of zero, positive one and negative one. The modulation and pulse transmission method of the present invention enables the simultaneous coexistence of the ultra-wideband pulses with conventional carrier-wave signals. The present invention may be used in wireless and wired communication networks such as hybrid fiber-coax networks.

In one embodiment of the present invention, data is transformed so that it will always include a zero in every pair of transmitted data bits. Zeros in the modulation technique of the present invention are represented by the absence of electromagnetic energy. Therefore, by ensuring a zero in every pair of transmitted data bits, the average energy transmitted into the radio frequency spectrum is reduced. This reduces the possibility of interfering with other signals, and alternatively, in another embodiment of the present invention, may allow the power of each ultra-wideband pulse to be increased.

One feature of the present invention is that the transmitted ultra-wideband pulses can have a spectral power density that does not cause interference with other communication signals.

Thus, the ultra-wideband pulses transmitted according to the methods of the present invention enable an increase in the bandwidth, or data rates of a communication system.

The present invention may be employed in any type of network, be it wireless, wired, or a mix of wire media and wireless components. That is, a network may use both wire media, such as coaxial cable, and wireless devices, such as satellites, or cellular antennas. As defined herein, a network is a group of points or nodes connected by communication paths. The communication paths may be connected by wires, or they may be wirelessly connected. A network as defined herein can interconnect with other networks and contain subnetworks. A network as defined herein can be characterized in terms of a spatial distance, for example, such as a local area network (LAN), a personal area network (PAN), a metropolitan area network (MAN), a wide area network (WAN), and a wireless personal area network (WPAN), among others. A network as defined herein can also be characterized by the type of data transmission technology in use on it, for example, a TCP/IP network, and a Systems Network Architecture network, among others. A network as defined herein can also be characterized by whether it carries voice, data, or both kinds of signals. A network as defined herein can also be characterized by who can use the network, for example, a public switched telephone network (PSTN), other types of public networks, and a private network (such as within a single room or home), among others. A network as defined herein can also be characterized by the usual nature of its connections, for example, a dial-up network, a switched network, a dedicated network, and a nonswitched network, among others. A network as defined herein can also be characterized by the types of physical links that it employs, for example, optical fiber, coaxial cable, a mix of both, unshielded twisted pair, and shielded twisted pair, among others.

The present invention may also be employed in any type of wireless network, such as a wireless PAN, LAN, MAN, WAN or WPAN. The present invention can be implemented in a "carrier free" architecture, which does not require the use of high frequency carrier generation hardware, carrier modulation hardware, stabilizers, frequency and phase discrimination hardware or other devices employed in conventional frequency domain communication systems. The present invention dramatically increases the bandwidth of conventional networks that employ wire media, but can be inexpensively deployed without extensive modification to the existing wire media network.

The present invention provides increased bandwidth by injecting, or otherwise super-imposing ultra-wideband (UWB) pulses into the existing data signal and subsequently recovers the UWB pulses at an end node, set-top box, subscriber gateway, or other suitable location. Ultra-wideband, or impulse radio, employs pulses of electromagnetic energy that are emitted at nanosecond or picosecond intervals (generally tens of picoseconds to a few nanoseconds in duration). For this reason, ultra-wideband is often called "impulse radio." That is, the UWB pulses may be transmitted without modulation onto a sine wave carrier frequency, in contrast with conventional radio frequency technology. Alternate implementations of UWB can be achieved by mixing the UWB pulses with a carrier wave that will control the center frequency of the resulting UWB pulses. Ultra-wideband generally requires neither an assigned frequency nor a power amplifier.

Conventional radio frequency technology employs continuous sine waves that are transmitted with data embedded in the modulation of the sine waves' amplitude or frequency. For example, a conventional cellular phone must operate at a particular frequency band of a particular width in the total frequency spectrum. Specifically, in the United States, the Federal Communications Commission has allocated cellular phone communications in the 800 to 900 MHz band. Cellular phone operators use 25 MHz of the allocated band to transmit cellular phone signals, and another 25 MHz of the allocated band to receive cellular phone signals.

Another example of a conventional radio frequency technology is illustrated in FIG. 1. 802.11a, a wireless local area network (LAN) protocol, transmits radio frequency signals at a 5 GHz center frequency, with a radio frequency spread of about 5 MHz.

Figure 2:
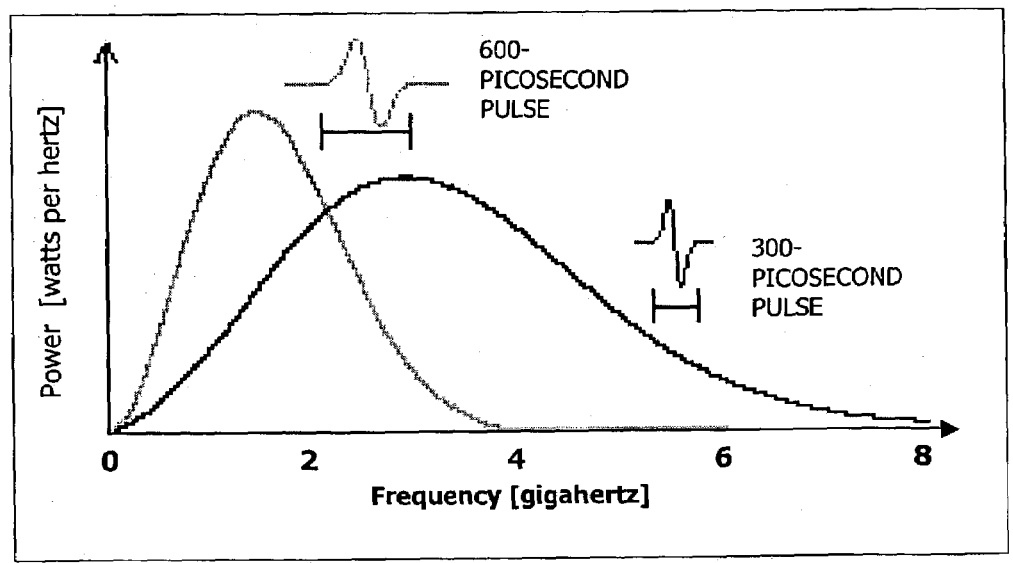
FIG. 2 is an illustration of two ultra-wideband pulses.

In contrast, a UWB pulse may have a 2.0 GHz center frequency, with a frequency spread of approximately 4 GHz, as shown in FIG. 2, which illustrates two typical UWB pulses. A UWB pulse is a single electromagnetic burst of energy. That is, a UWB pulse can be either a single positive burst of electromagnetic energy, or a single negative burst of electromagnetic energy. FIG. 2 illustrates that the narrower the UWB pulse in time, the broader the spread of its frequency spectrum. This is because bandwidth is inversely proportional to the time duration of the pulse. A 600 picosecond UWB pulse can have about a 1.6 GHz center frequency, with a frequency spread of approximately 3.2 GHz. And a 300 picosecond UWB pulse can have about a 3 GHz center frequency, with a frequency spread of approximately 3.2 GHz. Thus, UWB pulses generally do not operate within a specific frequency, as shown in FIG. 1. And because UWB pulses are spread across an extremely wide frequency range or bandwidth, UWB communication systems allow communications at very high data rates, such as 100 megabits per second or greater.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by this reference.

Also, because the UWB pulse is spread across an extremely wide frequency range, the power sampled at a single, or specific frequency is very low. For example, a UWB one-watt pulse of one nano-second duration spreads the one-watt over the entire frequency occupied by the pulse. At any single frequency, such as at the carrier frequency of a CATV provider, the UWB pulse power present is one nano-watt (for a frequency band of 1 GHz). This is well within the noise floor of any wire media system and therefore does not interfere with the demodulation and recovery of the original CATV signals. Generally, the multiplicity of UWB pulses are transmitted at relatively low power (when sampled at a single, or specific frequency), for example, at less than –30 power decibels to –60 power decibels, which minimizes interference with conventional radio frequencies. However, UWB pulses transmitted through most wire media will not interfere with wireless radio frequency transmissions. Therefore, the power (sampled at a single frequency) of UWB pulses transmitted though wire media may range from about +30 dBm to about –140 dBm.

Modulation techniques used to transmit data use a single symbol, or pulse, to represent a plurality of binary digits, or bits. This has the obvious advantage of increasing the data rate in a communications system. A few examples of modulation include Pulse Width Modulation (PWM), Pulse Amplitude Modulation (PAM), and Pulse Position Modulation (PPM). In PWM, a series of predefined pulse widths are used to represent different sets of bits. For example, in a system employing 8 different pulse widths, each symbol could represent one of 8 combinations. This symbol would carry 3 bits of information. In PAM, predefined amplitudes are used to represent different sets of bits. A system employing PAM16 would have 16 predefined amplitudes. This system would be able to carry 4 bits of information per symbol. In a PPM system, predefined positions within the pulse timeslot are used to carry a set of bits. A system employing PPM16 would be capable of carrying 4 bits of information per symbol. Systems typically employ more than one technique. This has the potential of vastly increasing the data rate of a communications system.

Generally, in some ultra-wideband (UWB) modulation techniques, a doublet or wavelet "chip" is modulated by a data signal. The data signal imparts a phase to the chip. A "doublet" or "wavelet" in some instances is a positive UWB pulse followed by a negative UWB pulse, or vice-versa. The two UWB pulses comprise a single chip, which is the smallest element of data in a modulated signal. In this case, the chip, comprising two UWB pulses, represents a single bit of data (a 1 or a 0). If the data bit being sent is a 0, the chip may start with a positive UWB pulse and end with a negative UWB pulse, and if the data bit being sent is a 1, the chip may start with a negative UWB pulse and end with a UWB positive pulse.

For example, in a bi-phasic or antipodal system the two-pulse "wavelet or doublet" or its inverse (180° phase shift) represents a 1 or a 0. These systems can additionally employ other modulation techniques such as PAM to develop multi-level bi-phasic modulation systems. PPM can additionally be used to carry more information on the same pulses. Other phase shifts may also be used such as 0°, 90°, 180°, and 270° shifts to develop quad-phasic, and with the application of PAM, multi-level quad-phasic systems. Alternatively, in binary phase shift keying (BPSK) the signal may be a single pulse of energy with the specific phase of the energy representing a 1 or a 0.

However, one element common to most of these modulation techniques is that a 0 is represented by at least a single positive or negative pulse of energy. In the bi-phasic or antipodal system described above, a 0 can be represented by two pulses of energy—a positive pulse and a negative pulse (or vice-versa). Alternatively, On-Off keying transmits a single data value 1 as a pulse and a data value of 0 as the absence of a pulse. Thus, in On-Off keying, only a single data value is sent with each pulse. Thus, conventional modulation techniques use energy, in the form of a pulse having a specific phase (positive or negative) to send each data bit. In the context of ultra-wideband (UWB) technology, which as described above, is capable of transmitting across wide radio frequency ranges, it is desirable to transmit by using the lowest possible energy, so as to avoid interfering with conventional radio frequency systems.

The present invention is distinct from the bi-phasic or antipodal systems mentioned above in that the data is not represented solely by phase shifts of a pulse doublet or wavelet. Instead, in one embodiment, the data is first encoded into ternary bits comprising: 1; 0; and –1. The data is then grouped so that a group of two binary digits (bits) always includes a 0. The data is then transmitted using a modulation method wherein the data bit information (1, 0 or –1) resides in any one of several unique patterns that may be transmitted. That is, the present invention employs unique UWB pulses, or pulse patterns, with each pulse, or pulse pattern including an absence of intentional energy. With each UWB pulse, or pulse pattern that is transmitted, the representation of two data bits is also transmitted. In a preferred embodiment of the present invention, four data groups are employed: 1,0; 0,1; –1,0; and 0,–1. Each data group is transmitted using only one UWB pulse, or pulse pattern, with the UWB pulse pattern comprising a single intentional pulse of energy, and an intentional absence of energy. The intentional absence of energy does not mean absolutely no energy, as it will be appreciated that unintentional energy can be present in any location, including the location of the intentional absence of energy. This unintentional energy may emanate from such sources as multi-path interference, multi-user interference, inter-symbol interference, and other sources.

One advantage of this embodiment is that the average energy used to transmit data is reduced by 50%, which greatly reduces the possibility of interfering with conventional radio frequency (RF) signals. This is because only one UWB pulse is used to transmit a two bit data group, whereas conventional modulation methods use multiple pulses to transmit the same amount of data.

An alternative embodiment of the present invention may then transmit the two bit group at a higher power level, that may or may not attain the power level that would have been used without the modulation method of the present invention. By transmitting at a higher power level, the transmission range may be increased, while still avoiding any interference with conventional RF signals.

Multi path interference can pose a significant problem in wireless communications systems. Multi path is the result of portions of the transmitted signal arriving at the intended receiver through different propagation paths. The multi path components are delayed in time due to their increased path length. A wireless receiver must be able to discriminate between intended signals and signals that arrive due to this multi path effect. Since the receiver need only pay attention to signals that arrive in a small number of pre determined time bins, multi path components arriving at other times can be ignored. The present invention therefore provides an increase in multi path immunity over other modulation techniques.

For example, given 25 time bins in a pulse transmission frame using PPM 16 would require the receiver to accurately discriminate intended pulses from multi path signals in 16 of the 25 time bins. In contrast, one embodiment of the present invention may place a single pulse of energy in one or two time bins of a pulse transmission frame containing 26 time bins. Energy arriving at the receiver in any of the remaining 24 time bins may then be ignored.

Generally, the amount of energy imparted into the RF spectrum is dependent on the number of pulses of electromagnetic energy sent within a given time frame. It is therefore advantageous to use lower pulse recurrence frequencies (PRFs), which are the number of ultra-wideband pulses sent per second. One drawback of lower PRFs is that the data rate is usually reduced. One feature of the present invention is that the PRF can be reduced without any reduction in data rate. For example, in one embodiment of the present invention, a pulse transmission frame duration is selected. If more than one bit group (N) is to be transmitted during the pulse transmission frame, the PRF may be reduced by a factor of N. This will be explained later, with reference to FIG. 10.

Figure 3:
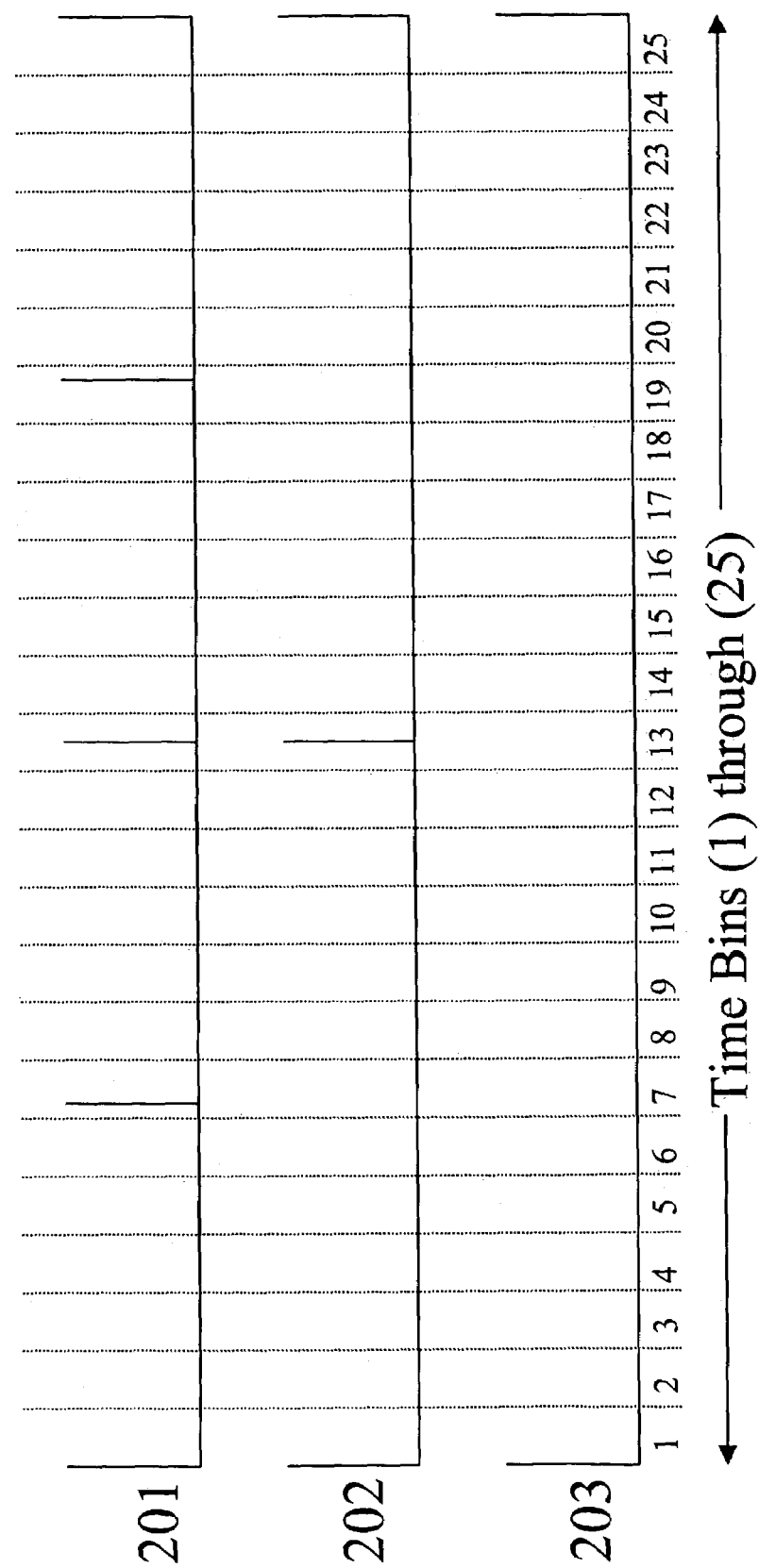
FIG. 3 is an illustration of time bins within ultra-wideband (UWB) pulse transmission frames according to three embodiments of the present invention.

As discussed above, the pulse recurrence frequency (PRF) is the number of ultra-wideband (UWB) pulses sent per second. For example, a PRF of 100 MHz may be employed. The inverse of the PRF would be the number of seconds, or fractions of a second, per UWB pulse. In this example, the inverse of 100 million pulses per second is 10 nano-seconds. This inverse of the PRF is the UWB pulse transmission frame. As shown in FIG. 3, the UWB pulse transmission frame is shown as groups of time bins. Specifically, time line 201 includes 25 time bins, which are segmented into four UWB pulse transmission frames, with each UWB pulse transmission frame comprising 6.25 time bins. Time line 202 includes 25 time bins, which are segmented into two UWB pulse transmission frames, with each UWB pulse transmission frame comprising 12.5 time bins. A single UWB pulse transmission frame is illustrated in time line 203, which includes 25 time bins.

In one embodiment of the present invention, a plurality of data bits are transmitted during each UWB pulse transmission frame, whether it is 210, 202 or 203. Another embodiment of the present invention may place the plurality of data bits within specific locations within the UWB pulse transmission frame, thereby adding an additional degree of modulation, and which may be used to further "whiten" the UWB pulse emissions within the radio frequency (RF) spectrum. It will be appreciated that other embodiments of the present invention may comprise PRFs of 200 MHz, 400 MHz, or other suitable PRFs. These PRFs may have durations that may be as low as 100 picoseconds. Different PRFs will also create different sized pulse transmission frames.

Figure 4:
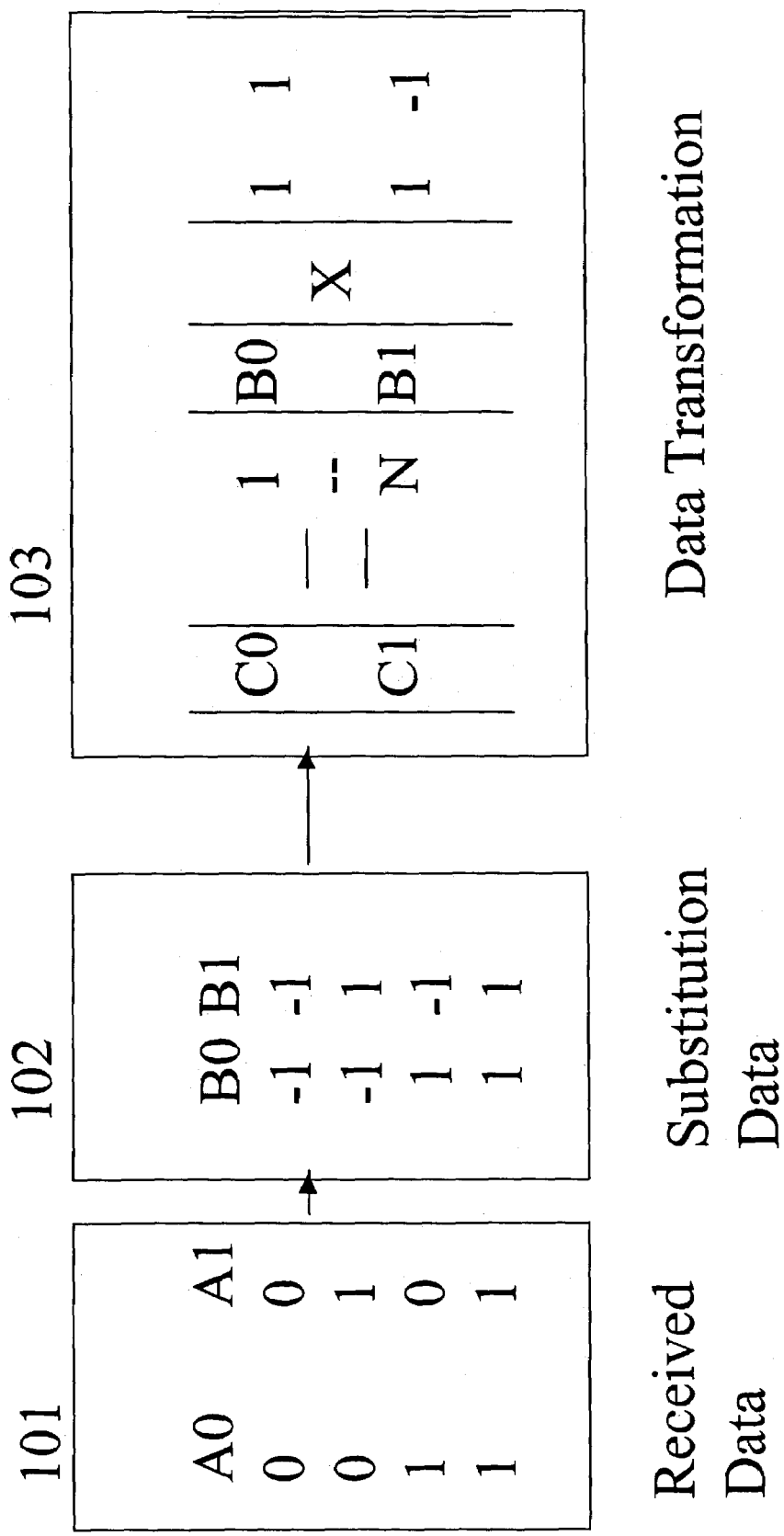
FIG. 4 is an illustration of a data manipulation method according to one embodiment of the present invention.

The data bits that are transmitted within the UWB pulse transmission frames 201, 202, 203 are first encoded according to the method illustrated in FIG. 4. In this embodiment, a data stream of interest is grouped into data groups A0 and A1 in received data block 101. The number of bits in this grouping may be any integer, but the preferred embodiment of the present invention employs a grouping of two, as shown. The data substitution block 102 then maps the data into bipolar data B0 and B1. In the illustrated embodiment, zeros (0) are substituted with negative ones (−1) and the ones (1) remain positive. It will be appreciated that there are other ways to map, or substitute the data and achieve the same result, such as mapping all ones (1) into negative ones (−1) and all zeros (0) into ones (1). The purpose of this step is to eliminate all zeros (0) from the received data 101.

In data transformation block 103, the new data B0 and B1 (that are re-grouped into a 1×2 matrix) are transformed into C0 and C1 (a 2×1 matrix) by a vector matrix product method, which then is multiplied by a scaling fraction (1/N). The scaling fraction (1/N or 1/n) is used to maintain the non-zero matrix product as a 1 or a −1. The 2×2 matrix depicted in the data transformation block 103 is an orthogonal matrix. An orthogonal matrix is a square matrix and its transpose is equal to its inverse. For example, a Walsh matrix is orthogonal, a Walsh-Hadamard matrix is orthogonal, as well as an inverse fast Fourier transform matrix. It will be appreciated that other matrices and orders of matrices may be used. For example, if the data group size were selected to be 4 bits per group, the transformation matrix would be a 4×4.

It will be appreciated with other matrices having the characteristic of an orthogonal matrix may be employed. That is, when two rows of the matrix are compared, half of the elements in each row are the same, and half are different. Put differently, half of the elements in each row are of like polarity, and half of the row is of opposite polarity. For example, the 2×2 matrix used in data transformation block 103 can be of the form of:

$$\begin{vmatrix} 1 & 1 \\ 1 & -1 \end{vmatrix}; \text{ or } \begin{vmatrix} 1 & -1 \\ 1 & 1 \end{vmatrix}; \text{ or } \begin{vmatrix} -1 & 1 \\ 1 & 1 \end{vmatrix}; \text{ or } \begin{vmatrix} 1 & 1 \\ -1 & 1 \end{vmatrix}.$$

The four matrices result in different combinations for C0 and C1 but each will result in a ternary modulation scheme of a preferred embodiment of the present invention, with one zero (0) present in every pair of transmission data values, or data groups. One feature of the present invention is that every pair of transmitted data bits contains a zero (0). This is achieved by multiplying the orthogonal matrix, as described above, with the B0 and B1 data (a 2×1 matrix), which is comprised of either a 1, −1; or −1, 1. The product is the C0, C1 data (a 2×1 matrix) that comprises at least one zero (0). Four data groups from the C0, C1 data are employed in the present invention: 1,0; 0,1; −1,0; and 0,−1.

Other embodiments of the present invention may comprise matrices that meet the condition of: ½ of the elements on each row are the same, and the other half are the inverse.

In the 2×2 case shown in FIG. 4, C0 can be expressed as (1/n)(B0+B1) and C1 can be expressed as (1/n)(B0−B1). In the case where n (the scaling factor used to keep the non-zero matrix product either a 1 or a −1) is chosen to be 2, the following table represents the results of the one embodiment of the data encoding method of the present invention. In this example, the data group consists of two consecutive data bits A0 and A1. They are mapped into bipolar data values B0 and B1, and then transformed into data values C0 and C1 that are ready for transmission.

TABLE 1

| A0 | A1 | B0 | B1 | C0 | C1 |
|----|----|----|----|----|----|
| 0 | 0 | −1 | −1 | −1 | 0 |
| 0 | 1 | −1 | 1 | 0 | −1 |
| 1 | 0 | 1 | −1 | 0 | 1 |
| 1 | 1 | 1 | 1 | 1 | 0 |

In a preferred embodiment of the present invention, every pair of transmission data C0 and C1 now contains one zero (0). This embodiment of the present invention ensures that there will be at least one zero (0) in each UWB pulse transmission frame. Below are the matrix equations that obtain C0 and C1 for the eight possible orthogonal matrices that only use 1 or −1:

$$\begin{bmatrix} C0 \\ C1 \end{bmatrix} = \frac{1}{N} \begin{bmatrix} 1 & 1 \\ 1 & -1 \end{bmatrix} \begin{bmatrix} B0 \\ B1 \end{bmatrix}$$

$$C0 = \frac{1}{N}(B0 + B1)$$

$$C1 = \frac{1}{N}(B0 - B1)$$

$$\begin{bmatrix} C0 \\ C1 \end{bmatrix} = \frac{1}{N} \begin{bmatrix} 1 & 1 \\ -1 & 1 \end{bmatrix} \begin{bmatrix} B0 \\ B1 \end{bmatrix}$$

$$C0 = \frac{1}{N}(B0 + B1)$$

$$C1 = \frac{1}{N}(-B0 + B1)$$

$$\begin{bmatrix} C0 \\ C1 \end{bmatrix} = \frac{1}{N} \begin{bmatrix} -1 & 1 \\ 1 & 1 \end{bmatrix} \begin{bmatrix} B0 \\ B1 \end{bmatrix}$$

$$C0 = \frac{1}{N}(-B0 + B1)$$

$$C1 = \frac{1}{N}(B0 + B1)$$

$$\begin{bmatrix} C0 \\ C1 \end{bmatrix} = \frac{1}{N} \begin{bmatrix} 1 & -1 \\ 1 & 1 \end{bmatrix} \begin{bmatrix} B0 \\ B1 \end{bmatrix}$$

$$C0 = \frac{1}{N}(B0 - B1)$$

$$C1 = \frac{1}{N}(B0 + B1)$$

$$\begin{bmatrix} C0 \\ C1 \end{bmatrix} = \frac{1}{N} \begin{bmatrix} -1 & -1 \\ -1 & 1 \end{bmatrix} \begin{bmatrix} B0 \\ B1 \end{bmatrix}$$

$$C0 = \frac{1}{N}(-B0 - B1)$$

$$C1 = \frac{1}{N}(-B0 + B1)$$

$$\begin{bmatrix} C0 \\ C1 \end{bmatrix} = \frac{1}{N} \begin{bmatrix} -1 & -1 \\ 1 & -1 \end{bmatrix} \begin{bmatrix} B0 \\ B1 \end{bmatrix}$$

$$C0 = \frac{1}{N}(-B0 - B1)$$

$$C1 = \frac{1}{N}(B0 - B1)$$

$$\begin{bmatrix} C0 \\ C1 \end{bmatrix} = \frac{1}{N} \begin{bmatrix} 1 & -1 \\ -1 & -1 \end{bmatrix} \begin{bmatrix} B0 \\ B1 \end{bmatrix}$$

$$C0 = \frac{1}{N}(B0 - B1)$$

$$C1 = \frac{1}{N}(-B0 - B1)$$

$$\begin{bmatrix} C0 \\ C1 \end{bmatrix} = \frac{1}{N} \begin{bmatrix} -1 & 1 \\ -1 & -1 \end{bmatrix} \begin{bmatrix} B0 \\ B1 \end{bmatrix}$$

$$C0 = \frac{1}{N}(-B0 + B1)$$

$$C1 = \frac{1}{N}(-B0 - B1)$$

In one embodiment of the present invention, the transformation matrix is defined by rows that are orthogonal to each other. This orthogonality condition generally requires that a vector product of each row with any other row of the matrix is zero (0). In the case of a 4×4 matrix with properties similar to a Walsh-Hadamard matrix, this orthogonality condition is met by ensuring that each row of the matrix has exactly half of the elements of any other row equivalent and the other half of the elements are the compliment of the elements of any other row. For example, an orthogonal 4×4 matrix with properties similar to a Walsh-Hadamard matrix may take the form below:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

In this example, it is seen by comparison of rows that exactly half of the elements of each row are equivalent and the other half of the elements are the compliment of every other row. The orthogonality condition is demonstrated by sample vector product calculations, as follows: The vector product of rows 1 and 2 is calculated as follows:

$$\begin{bmatrix} 1 & 1 & 1 & 1 \end{bmatrix} \begin{bmatrix} 1 \\ -1 \\ 1 \\ -1 \end{bmatrix} = (1 X 1) + (1 X - 1) + (1 X 1) + (1 X - 1) = 0$$

The vector product of rows 1 and 3 is calculated as follows:

$$\begin{bmatrix} 1 & 1 & 1 & 1 \end{bmatrix} \begin{bmatrix} 1 \\ 1 \\ -1 \\ -1 \end{bmatrix} = (1 X 1) + (1 X 1) + (1 X - 1) + (1 X - 1) = 0$$

Similarly, it can be shown that the remainder of vector products of each row with any other row in a matrix with properties similar to a Walsh-Hadamard matrix is zero. An inverse fast Fourier transform (IFFT) matrix can be shown to be orthogonal in this respect as well. The 4×4 IFFT matrix is defined as:

$$\begin{bmatrix} 1 & 1 & 1 & 1 \\ 1 & j & -1 & -j \\ 1 & -1 & 1 & -1 \\ 1 & -j & -1 & j \end{bmatrix}$$

where $j=\sqrt{-1}$

From the above discussion, the orthogonality of rows 1 and 3, and 2 and 4 should be apparent from the condition where half of the elements are equivalent and half are the compliment.

Comparing rows 1 and 2 yields the following vector product:

$$[1\ 1\ 1\ 1]\begin{bmatrix} 1 \\ j \\ -1 \\ -j \end{bmatrix} = (1 X 1) + (1 X j) + (1 X -1) + (1 X -j) = 0$$

Likewise it can be shown that rows three and four are orthogonal.

$$[1\ -1\ 1\ -1]\begin{bmatrix} 1 \\ -j \\ -1 \\ j \end{bmatrix} = (1 X 1) + (-1 X -j) + (1 X -1) + (-1 X j) = 0$$

In similar manner it can be shown that the IFFT matrix of any order satisfies this orthogonality condition. Thus, it will be appreciated that other orthogonal matrices may be employed in various embodiments of the present invention.

In an embodiment of the present invention where a 4×4 matrix with properties similar to a Walsh-Hadamard matrix is used, the resultant modulation scheme is multi-level. In this embodiment, the data would be transformed in sets of 4 consecutive bits. Then the product of the data vector, times a fraction multiplied by the appropriate matrix, would produce the data for transmission. When grouping data in sets of 4 there are 16 possible combinations of bits. The combinations are: 0000, 0001, 0010, 0011, 0100, 0101, 0110, 0111, 1000, 1001, 1010, 1011, 1100, 1101, 1110, and 1111. In this embodiment, once again all zeros (0) are replaced with negative ones (−1), or alternatively, all ones (1) are replaced with negative ones (−1) and all zeros (0) are replaced with ones (1). In the situation where all zeros (0) are replaced with negative ones (−1) the result of this replacement would yield: −1−1−1−1, −1−1−11, −1−11−1, −1−111, −11,−1−1, 1−1−11,−111−1,−1111, 1−1−1−1, 1−1−1−11, 1−111, 11−11, 111−1, and 1111. The 4×4 matrix then multiplies these groups of data.

Generally, the original data $A_n$ is mapped into bipolar data $B_n$. The data is then transformed into transmission data $C_n$ in the following manner:

$$\begin{vmatrix} C0 \\ C1 \\ C2 \\ C3 \end{vmatrix} = \frac{1}{N}\begin{vmatrix} 1 & 1 & 1 & 1 \\ 1 & -1 & 1 & -1 \\ 1 & 1 & -1 & -1 \\ 1 & -1 & -1 & 1 \end{vmatrix} X \begin{vmatrix} B0 \\ B1 \\ B2 \\ B3 \end{vmatrix}$$

The result of this transformation gives the following equalities:

$$C0 = \frac{1}{N}(B0 + B1 + B2 + B3)$$

$$C1 = \frac{1}{N}(B0 - B1 + B2 - B3)$$

$$C2 = \frac{1}{N}(B0 + B1 - B2 - B3)$$

$$C3 = \frac{1}{N}(B0 - B1 - B2 + B3)$$

Selectin N=2 results in the following TABLE 2:

TABLE 2

| A0 | A1 | A2 | A3 | B0 | B1 | B2 | B3 | C0 | C1 | C2 | C3 |
|---|---|---|---|---|---|---|---|---|---|---|---|
| 0 | 0 | 0 | 0 | −1 | −1 | −1 | −1 | −2 | 0 | 0 | 0 |
| 0 | 0 | 0 | 1 | −1 | −1 | −1 | 1 | −1 | −1 | −1 | −1 |
| 0 | 0 | 1 | 0 | −1 | −1 | 1 | −1 | −1 | 1 | −1 | −1 |
| 0 | 0 | 1 | 1 | −1 | −1 | 1 | 1 | 0 | 0 | −2 | 0 |
| 0 | 1 | 0 | 0 | −1 | 1 | −1 | −1 | −1 | −1 | 1 | −1 |
| 0 | 1 | 0 | 1 | −1 | 1 | −1 | 1 | 0 | −2 | 0 | 0 |
| 0 | 1 | 1 | 0 | −1 | 1 | 1 | −1 | 0 | 0 | 0 | −2 |
| 0 | 1 | 1 | 1 | −1 | 1 | 1 | 1 | 1 | −1 | −1 | −1 |
| 1 | 0 | 0 | 0 | 1 | −1 | −1 | −1 | −1 | 1 | 1 | 1 |
| 1 | 0 | 0 | 1 | 1 | −1 | −1 | 1 | 0 | 0 | 0 | 2 |
| 1 | 0 | 1 | 0 | 1 | −1 | 1 | −1 | 0 | 2 | 0 | 0 |
| 1 | 0 | 1 | 1 | 1 | −1 | 1 | 1 | 1 | 1 | −1 | 1 |
| 1 | 1 | 0 | 0 | 1 | 1 | −1 | −1 | 0 | 0 | 2 | 0 |
| 1 | 1 | 0 | 1 | 1 | 1 | −1 | 1 | 1 | −1 | 1 | 1 |
| 1 | 1 | 1 | 0 | 1 | 1 | 1 | −1 | 1 | 1 | 1 | −1 |
| 1 | 1 | 1 | 1 | 1 | 1 | 1 | 1 | 2 | 0 | 0 | 0 |

Thus, it will be appreciated that 2×2, 4×4 and other matrices may be employed by the present invention.

Figure 5:
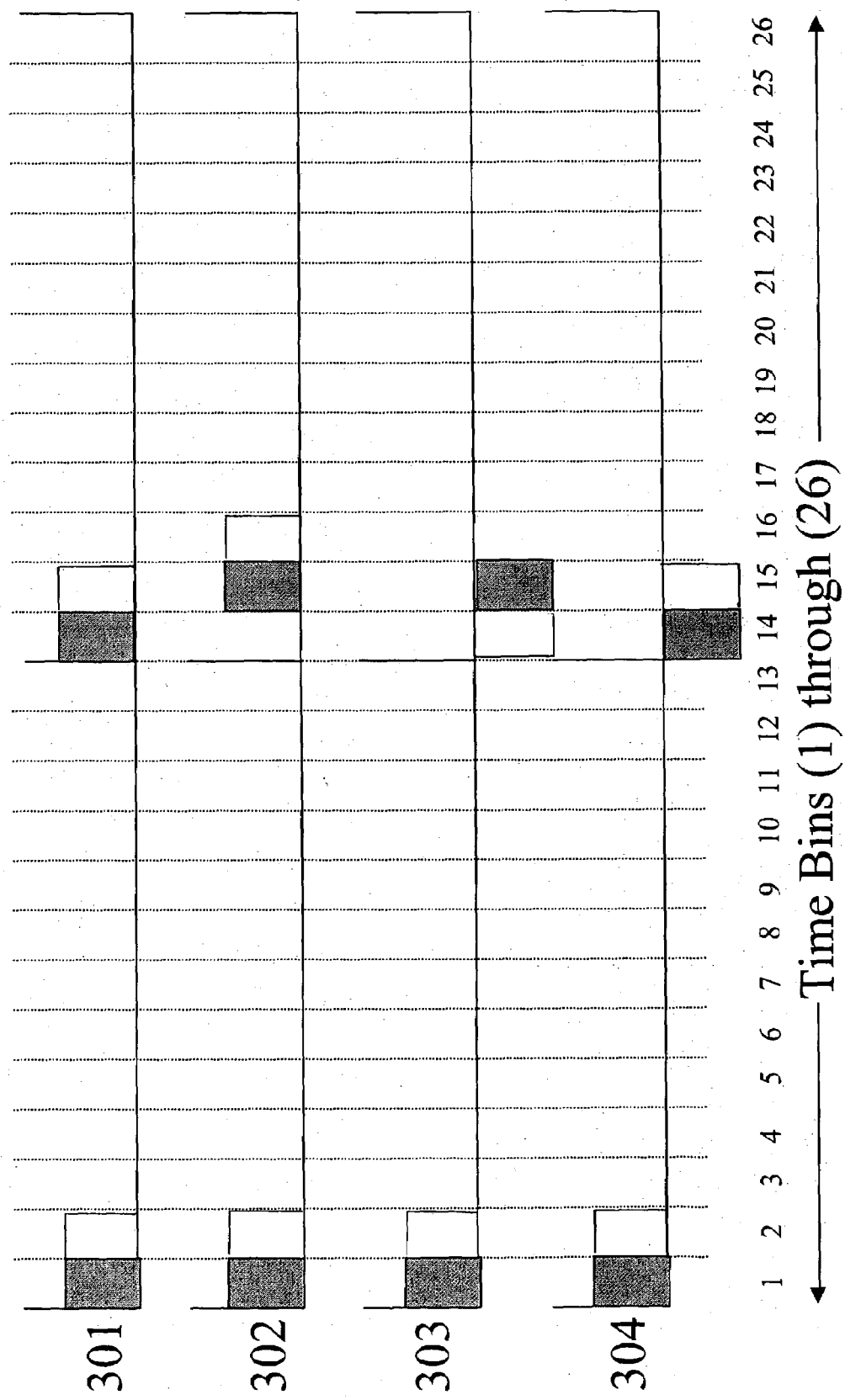
FIG. 5 is an illustration of UWB pulses positioned in time bins within UWB pulse transmission frames according to one embodiment of the present invention.

Referring now to FIG. 5, another feature of the present invention is illustrated. After the data of interest has been encoded, or transformed, as discussed above (and shown in FIG. 4), the data is then transmitted using UWB pulses, or pulse patterns, which are represented in FIGS. 5–8 as delineated regions in the time lines 301, 302, 303 304, 401, 402, 403, 404, 501, 502, 503, 504, 601, 602, 603, and 604. Each of the time lines includes two UWB pulse transmission frames, with each pulse transmission frame comprising 13 time bins.

As discussed above, in a preferred embodiment of the present invention, each two data bits includes a zero (0), and the other bit is either a 1 or a −1. Specifically, four data bit groups from the C0, C1 data (shown in FIG. 4) are employed in the present invention: 1,0; 0,1;−1,0; and 0,−1. One feature of the present invention is that the UWB pulse modulation used to transmit symbols representing the data bit groups comprises a pulse pattern of either a pulse of positive polarity, or a pulse of negative polarity. That is, either a positive UWB pulse pattern is sent, or a negative UWB pulse pattern is sent. The positive pulse pattern represents two data bits comprising 1,0 (or 0,1) and a negative pulse represents two data bits comprising −1,0 (or 0,−1). One feature of the present invention is that only one UWB pulse, or pulse pattern is sent, but an additional symbol (a 0) is also sent. The 0 is represented by an absence, or lack of, UWB pulse energy. In this way a representation of two data bits are sent while using only one UWB pulse. One advantage of this embodiment is that the average energy used to transmit data is reduced by 50%, which greatly reduces the possibility of interfering with conventional radio frequency (RF) signals. An alternative embodiment of the present invention may then transmit the two bit group at a higher power level, that may or may not attain the power level that would have been used without the modulation method of the present invention. By transmitting at a higher power level, the transmission range may be increased, while still avoiding any interference with conventional RF signals.

FIG. 5 depicts four time lines: 301, 302, 303 and 304. In this embodiment of the present invention, each time line includes two UWB pulse transmission frames, with each pulse transmission frame comprising 13 time bins. Alternatively, other embodiments may employ UWB pulse transmission frames that use other numbers of time bins (as illustrated in FIG. 3), or other numbers of time bins, as appropriate.

In the embodiment illustrated in FIG. 5, the time lines 301, 302, 303 and 304 are each 10 nano-seconds in duration, and each time line is capable of transmitting four data bits. Thus, the data transmission rate is 400 Mbps. Other data transmission rates are possible, as will be explained below, with reference to FIGS. 3 and 10.

A preferred embodiment of the present invention uses time bins 1, 2, 14 and 15 to transmit data, with the other time bins available for other uses. In this embodiment, reflection appearing in any other time bin may be ignored. Alternatively, the UWB pulse may occupy another predetermined time bin to "whiten" the RF spectrum. That is, the spectral peaks of the UWB pulses are reduced, thereby avoiding interference with conventional RF signals.

Referring again to FIG. 5, time line 301 represents a 1,0 in time bins 1 and 2, and 1,0 in time bins 14 and 15. Again, a positive phase, or polarity UWB pulse represents a 1, and the 0 is represented by a lack of UWB pulse energy. Put differently, specific UWB pulse patterns are sent, with each UWB pulse pattern representing a data bit group. The shaded region in time bins 1 and 14 represents the primary UWB pulse, or pulse energy, and the adjacent non-shaded region in time bins 2 and 15 represent a lack of UWB pulse energy.

The modulated data representation in time line 302 is 1,0 in time bins 1 and 2, and 0,1 in time bins 14 and 15. The modulated data representation in time line 303 is 1,0 in time bins 1 and 2, and 0,−1 in time bins 14 and 15. The modulated data representation in time line 304 is 1,0 in time bins 1 and 2, and −1,0 in time bins 14 and 15.

In one embodiment of the present invention, a UWB receiver determines the time bin location of the primary pulse energy, or the positive or negative pulse within the UWB pulse transmission frame, and adds a 0, either before or after the 1 (positive pulse) or −1 (negative pulse). This modulation logic can either be in the form of hardware or software, depending on the implementation. In this way, four bits of data are represented in each time line 301, 302, 303 or 304.

Figure 6:
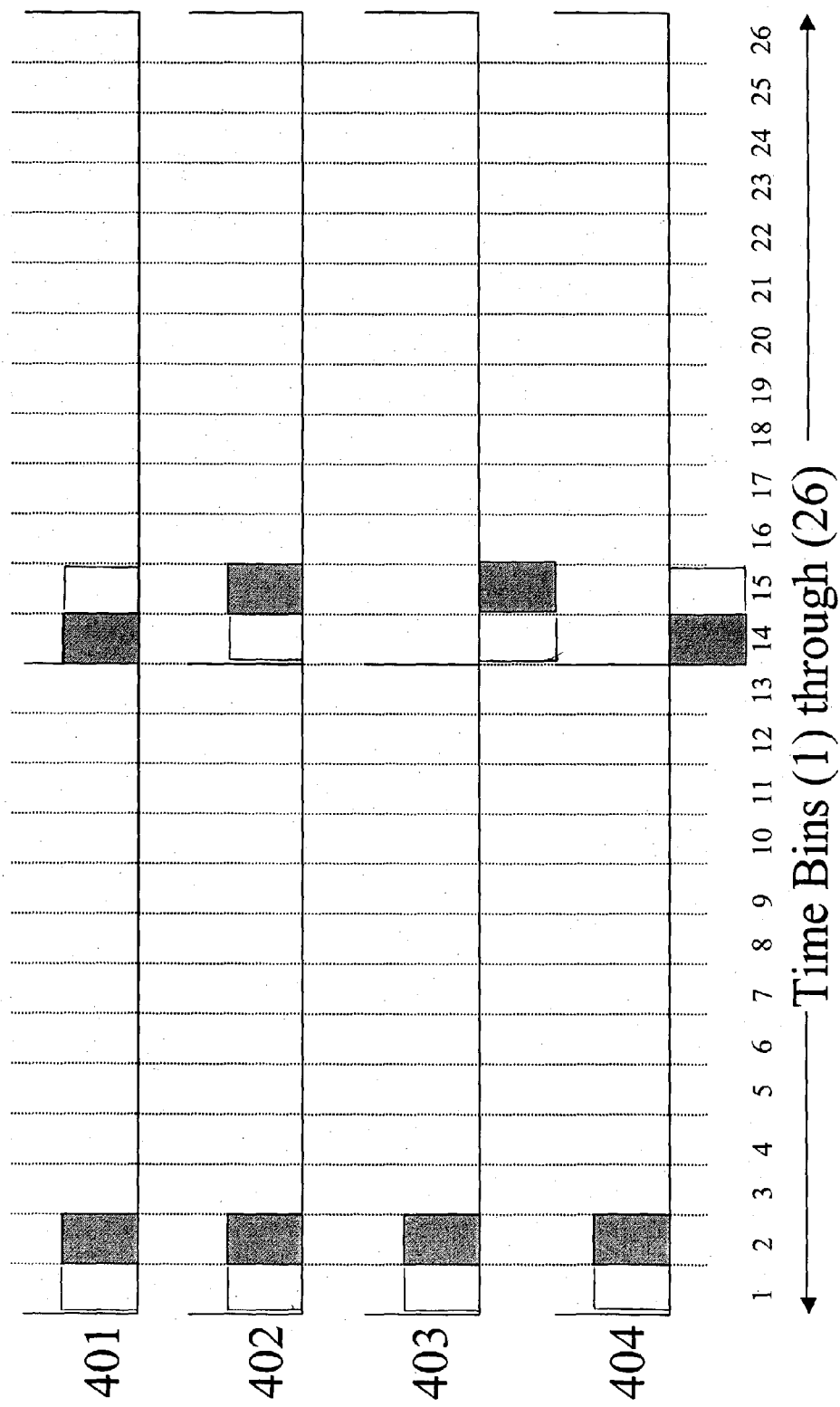
FIG. 6 is an illustration of UWB pulses positioned in time bins within UWB pulse transmission frames according to one embodiment of the present invention.

Referring now to FIG. 6, other UWB pulse modulation examples are presented. The modulated data representation in time line 401 is 0,1 in time bins 1 and 2, and 1,0 in time bins 14 and 15. The modulated data representation in time line 402 is 0,1 in time bins 1 and 2, and 0,1 in time bins 14 and 15. The modulated data representation in time line 403 is 0,1 in time bins 1 and 2, and 0,−1 in time bins 14 and 15. The modulated data representation in time line 404 is 0,1 in time bins 1 and 2, and −1,0 in time bins 14 and 15.

Figure 7:
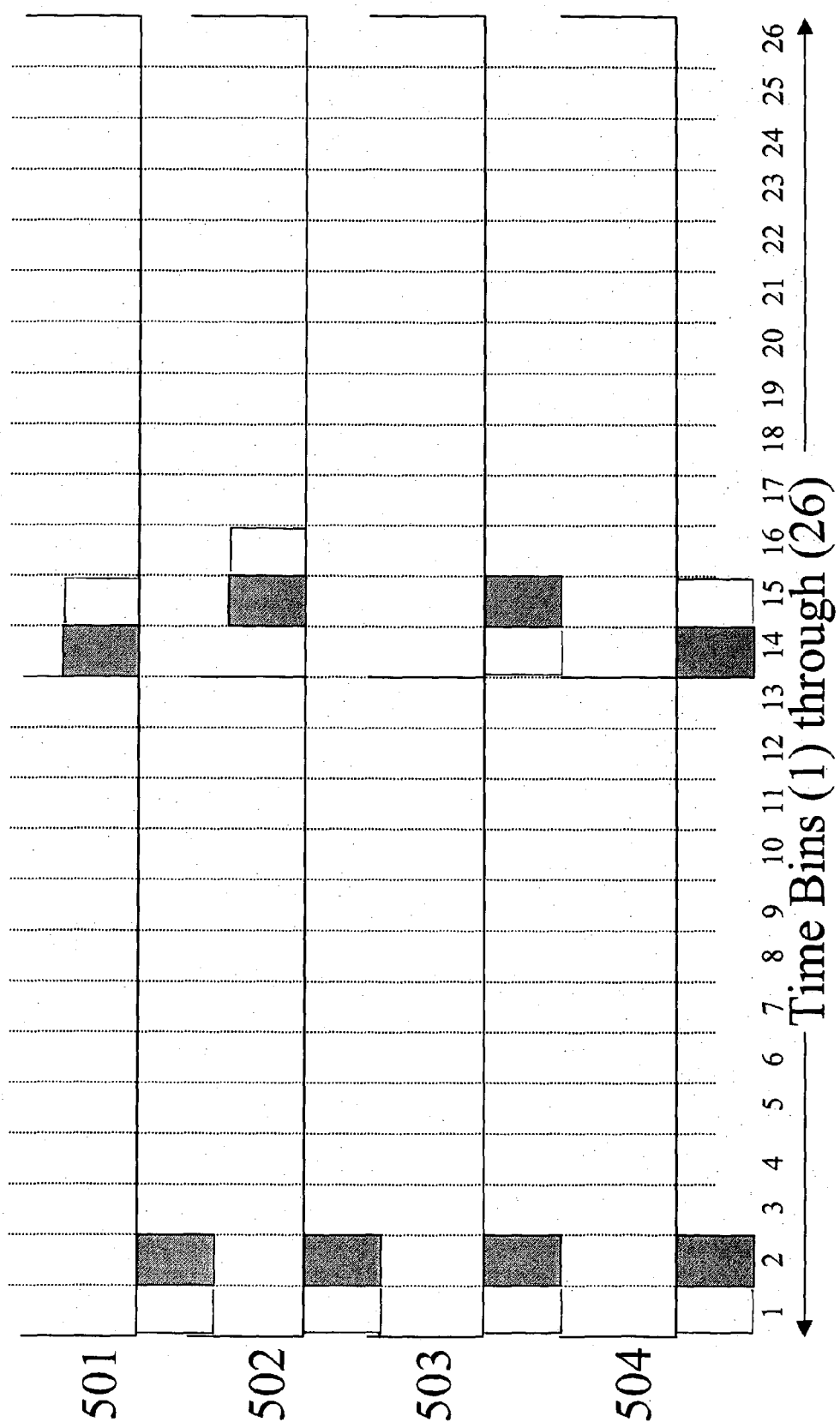
FIG. 7 is an illustration of UWB pulses positioned in time bins within UWB pulse transmission frames according to one embodiment of the present invention.

Referring now to FIG. 7, additional UWB pulse modulation examples are presented. The modulated data representation in time line 501 is 0,−1 in time bins 1 and 2, and 1,0 in time bins 14 and 15. The modulated data representation in time line 502 is 0,−1 in time bins 1 and 2, and 0,1 in time bins 14 and 15. The modulated data representation in time line 503 is 0,−1 in time bins 1 and 2, and 0,−1 in time bins 14 and 15. The modulated data representation in time line 504 is 0,−1 in time bins 1 and 2, and −1,0 in time bins 14 and 15.

Figure 8:
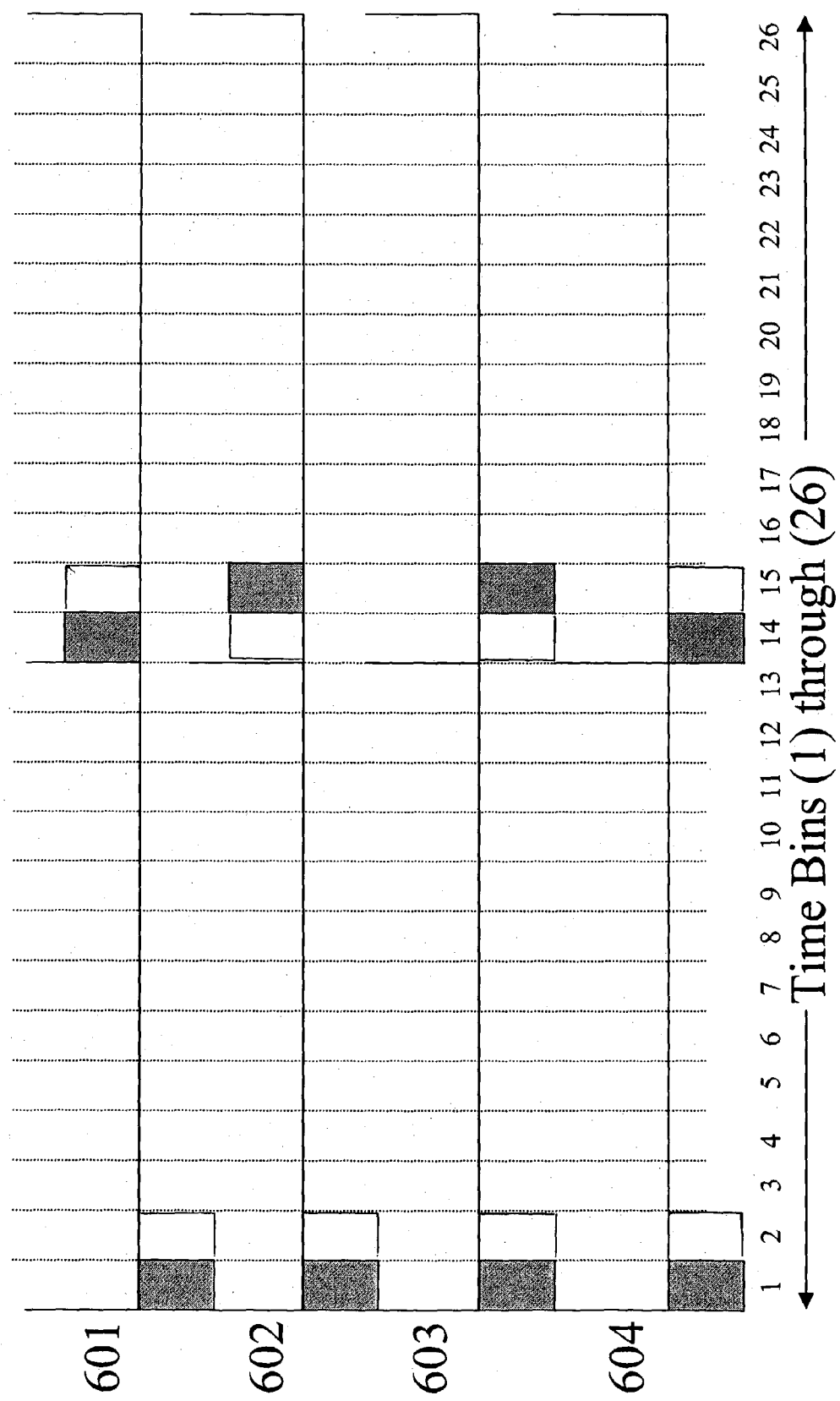
FIG. 8 is an illustration of UWB pulses positioned in time bins within UWB pulse transmission frames according to one embodiment of the present invention.

As shown in FIG. 8, other UWB pulse modulation examples are presented. The modulated data representation in time line 601 is −1,0 in time bins 1 and 2, and 1,0 in time bins 14 and 15. The modulated data representation in time lines 602 is −1,0 in time bins 1 and 2, and 0,1 in time bins 14 and 15. The modulated data representation in time line 603 is −1,0 in time bins 1 and 2, and 0,−1 in time bins 14 and 15. The modulated data representation in time line 604 is −1,0 in time bins 1 and 2, and −1,0 in time bins 14 and 15.

Thus, as described above, representations of multiple data bit groups may be transmitted by a single UWB pulse, or pulse pattern. It will be appreciated that the method of ternary encoding and modulation described above can also be employed with other modulation techniques, such as pulse amplitude modulation.

Referring now to FIG. 3, yet other embodiments of the present invention are illustrated. FIG. 3 illustrates alternative embodiment time lines 201, 202 and 203. For example, in time line 201, three distinct UWB pulse transmission frames are illustrated, each having 6.25 distinct time bins. That is, a UWB pulse duration of 400 pico-seconds and a UWB pulse recurrence frequency (PRF) of 400 Mega Hertz (MHz) establishes 6.25 distinct time bins for each of the three UWB pulse transmission frames illustrated in 201, with a UWB pulse transmission frame duration of 2.5 nano-seconds. In this embodiment, a single UWB pulse, or pulse pattern, comprised of either a negative pulse (−1) or a positive pulse (1) could occupy any one of the 6.25 bins. In one embodiment, the UWB pulse may occupy the first time bin position allowing for a 5.25 time bin "guard time" before the next UWB pulse transmission frame. In this embodiment, reflection appearing in any other time slot may be ignored. Alternatively, the UWB pulse may occupy a predetermined time bin and may be used to "whiten" the RF spectrum.

In an alternative embodiment of the present invention is illustrated in time line 202, which shows two distinct UWB pulse transmission frames. With the same UWB pulse duration of 400 pico-seconds (as time line 201) and a 200 MHz PRF, there are 12.5 time bins within each of the two UWB pulse transmission frames, shown in time line 202. The UWB pulse transmission frame in this embodiment is 5.0 nano-seconds in duration. In this embodiment, a data rate of 400 Mega-Bits-Per-Second (Mbps) is obtained by utilizing two time bins within each time line 202. In this embodiment, the pair of UWB pulses, or pulse patterns (one in each time bin of the 12.5 available) will contain the bit representation of a 1 or a −1, and at least one zero (0). Like the previous embodiment, the location of that data pair may begin at any predetermined time bin (1–12.5) within the frame. In this embodiment, if the time bins are selected as 1 and 2, there will be pulse energy in only time bins 1 and 2. As discussed above, the UWB pulse may either have a positive or negative polarity. Thus, there are 10.5 time-bins where the presence of pulse energy is not expected, and thus may represent a reflection, or a multi-path version of a UWB pulse, which can be ignored, thereby decreasing the bit error rate. In addition, dithering the used time bins will further "whiten" the RF spectrum.

Again referring to FIG. 3, another embodiment of the present invention, illustrated as time line 203, has a fundamental PRF of 100 MHz. If the UWB pulse duration is 400 pico-seconds, there are 25 distinct time-bins (1–25) within the time line 203. The pulse transmission frame duration in this case is 10 nano-seconds. To maintain the same 400 Mbps data rate, 4 data bits may be sent within this UWB pulse transmission frame. As with the above examples, the presence or intentional absence of energy, and the polarity of energy when present, represents the four data bits.

Figure 10:
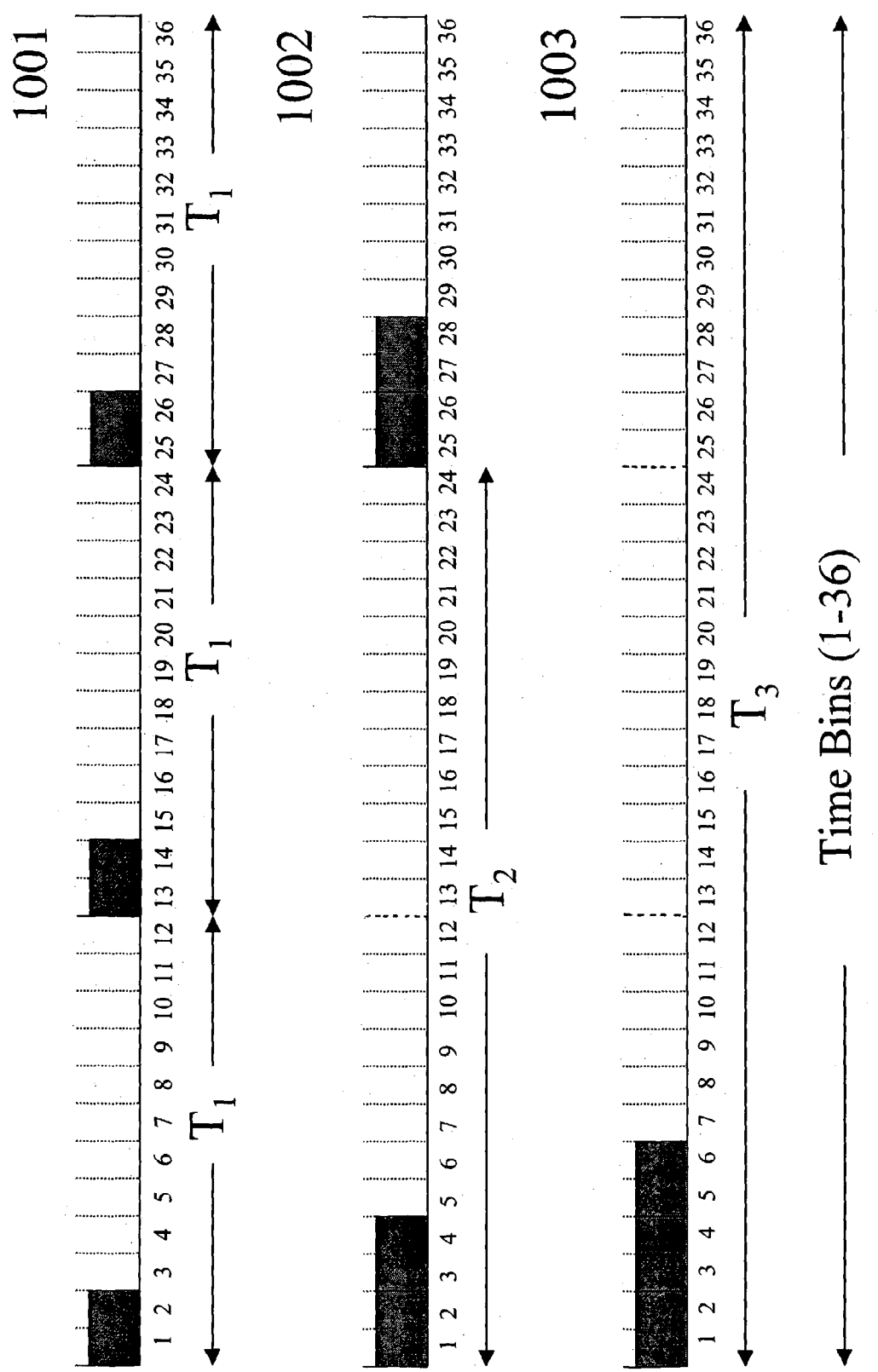
FIG. 10 is an illustration of UWB pulses positioned in time bins within UWB pulse transmission frames according to another embodiment of the present invention.

As shown in FIG. 10, three time lines 1001, 1002, and 1003 are illustrated. Time line 1001 includes three pulse transmission frames $T_1$, with each pulse transmission frame $T_1$ having 12 time bins, with each time bin 400 picoseconds in duration. Time line 1002 includes two pulse transmission frames $T_2$, with one pulse transmission frame $T_2$ having 24 time bins, and the other pulse transmission frame $T_2$ having 12 time bins. Time line 1003 has only one pulse transmission frame $T_3$, with 36 time bins. It will be appreciated that the size of the pulse transmission frames $T_1$, $T_2$, or $T_3$, may be arbitrarily selected, depending upon the desired data transmission rate, transmission range, and other factors. It will also be appreciated that the duration of each time bin may also vary, depending on any number of factors.

In time line 1001, one bit group is transmitted in each pulse transmission frame $T_1$ in time bins 1–2, 13–14 and 25–26. Each time bin has a duration of 400 picoseconds, and thus the PRF, or number of pulses per second, of this example is calculated as $1/T_1$, which is 208.3 MHz. In time line 1002, two bit groups are transmitted in time bins 1–4 and 25–28. The PRF in this case is calculated to be $1/T_2$, which is 104.16 MHz. In time line 1003, three bit groups are transmitted in time bins 1–6, with the PRF in this example is $1/T_3$, which is 69.4 MHz. The PRF is therefore reduced by a factor of N when N bit groups are transmitted. Put differently, the data rate is maintained, but the number of UWB pulses sent per second is decreased. One advantage of this feature is that a receiver must only look for energy in 6 time bins, of a pulse transmission frame that has 36 time bins (time line 1003). Any energy present in time bins 7–36 can be ignored, significantly reducing multi-path effects, and bit error rates.

Figure 9:
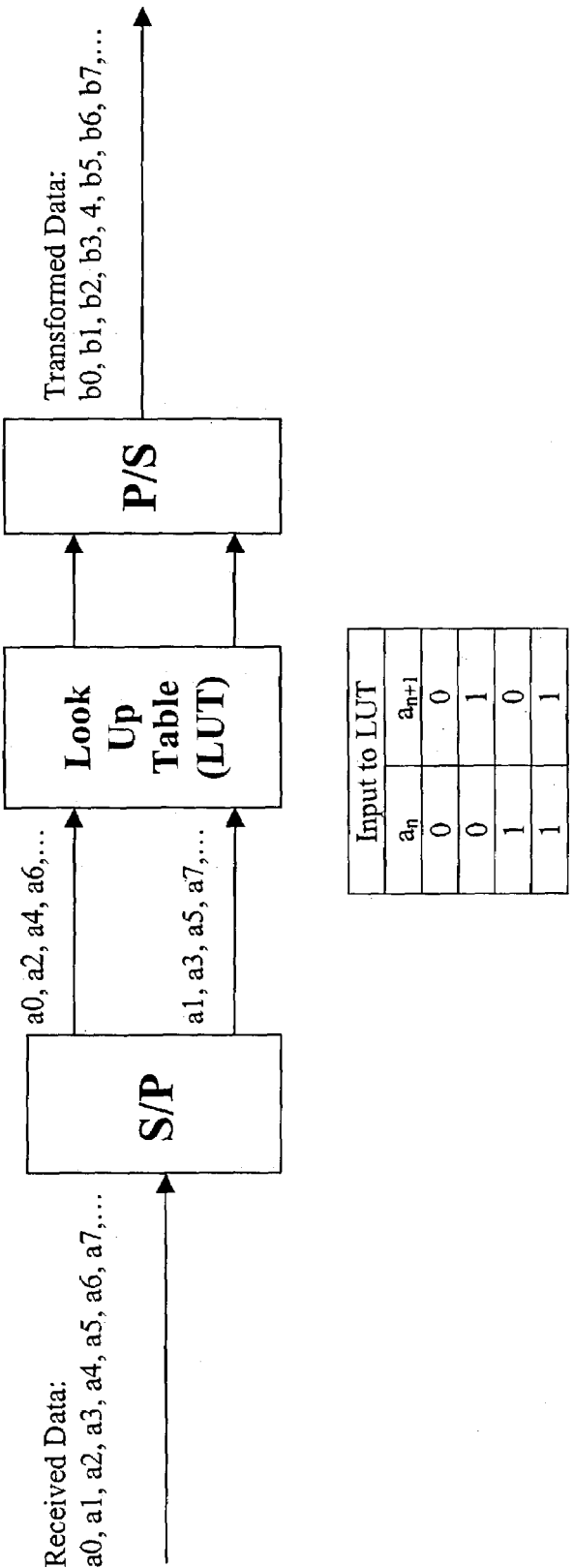
FIG. 9 is a schematic illustration of one method of practicing the present invention.

Referring to FIG. 9, a schematic diagram of one embodiment of the present invention is illustrated. Data from any source, such as web pages, computer programs, video, audio, imagery, or text, is provided as a0, a1, a2 . . . . This data stream may consist of binary digit in the form of: . . . 010001110110 . . . . This data is organized by the S/P (serial to parallel processor) into two-bit data groups comprising: 01; 00; 01; 11; 01; and 10. These data groups are analyzed by a look-up table (LUT) that contains either hardware or software that performs the steps as described above in connection with FIG. 4 to map the data. The mapped data may take the form of: −11; −1-1; −11; 11; −11; and −1-1. Applying the methods described herein (and illustrated in FIG. 4), and depending on which transform matrix is applied, the data may then me transformed into data groups comprising: 10;01;−10; and 0−1. The data is now ready for transmission, and is forwarded to the P/S (parallel to serial processor), which then forwards it onward for actual transmission. Alternatively, the original data pairs may be mapped directly into transformed data pairs by the use of a LUT. This embodiment avoids the calculations of the transformation matrix.

Thus, it is seen that an apparatus and method for modulating, and transmitting electromagnetic pulses, such as ultra-wideband pulses, is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the instant disclosure, and the present invention is limited only by the instant disclosure. It is noted that various equivalents for the particular embodiments discussed in this description may practice the invention as well.

What is claimed is:

1. A method of communicating data, the method comprising the steps of:
   receiving a plurality of data bits;
   converting each of the plurality of data bits into either ones or a negative ones;
   grouping the one or negative one bits into bit groups that include a zero; and
   transmitting the bit groups by emitting a single ultra-wideband pulse.

2. The method of claim 1, wherein the step of converting the bits into either a one or a negative one comprises the steps of:
   changing the plurality of data bits that are comprised of a plurality of ones and zeros into a plurality of data bits that are selectively comprised of ones, zeroes, and negative ones.

3. The method of claim 1, wherein the step of grouping the one or negative one bits into bit groups that include a zero comprises the steps of:
   multiplying the plurality of one and negative one data bits by a transformation matrix.

4. The method of claim 1, wherein the step of grouping the one or negative one bits into bit groups that include a zero comprises the steps of:
   using a look-up table that groups the one or negative one bits into bit groups that include a zero.

5. The method of claim 3, wherein the transformation matrix is selected from a group consisting of: a Walsh matrix, a Walsh-Hadamard matrix, an orthogonal matrix, a 2×2 Walsh matrix, a 4×4 Walsh matrix, a Walsh matrix of order greater than 4, and a 2×2 inverse fast Fourier transform matrix.

6. The method of claim 1, wherein the step of transmitting the bit groups by emitting a single ultra-wideband pulse comprises the steps of:
   transmitting an ultra-wideband electromagnetic energy pulse comprising either a positive pulse or a negative pulse.

7. The method of claim 1, further including the step of:
   receiving the ultra-wideband electromagnetic energy pulse comprising either a positive pulse or a negative pulse; and assigning a data value to the ultra-wideband electromagnetic pulse based on an absence or presence of the pulse within a time bin and a polarity of the ultra-wideband electromagnetic pulse.

8. The method of claim 1, wherein the step of grouping the one or negative one bits into bit groups that include a zero comprises the step of grouping the one or negative one bits into two bit groups that include a zero.

9. The method of claim 1, wherein the step of grouping the one or negative one bits into bit groups that include a zero comprises the step of:
assembling the one or negative one bits data into a group selected from a group consisting of: a 2-bit group, a 4-bit group, an 8-bit group, a 16-bit group, a 32-bit group, a 64-bit group and a 128-bit group.

10. The method of claim 1, wherein the step of converting each of the plurality of data bits into either a one or a negative one comprises any one of the steps of:
replacing each zero within the plurality of data bits with a negative one;
replacing each zero within the plurality of data bits with a positive one; and
replacing each one within the plurality of data bits with a negative one.

11. The method of claim 1, wherein the single ultra-wideband pulse is selected from a group consisting of: an electromagnetic energy ultra-wideband pulse and an impulse radio pulse.

12. The method of claim 1, wherein the step of transmitting the bit groups by emitting a single ultra-wideband pulse comprises transmitting the bit groups by emitting a single ultra-wideband pulse through a media selected from a group consisting of: air, an optical fiber ribbon, a fiber optic cable, a single mode fiber optic cable, a multi mode fiber optic cable, a twisted pair wire, an unshielded twisted pair wire, a plenum wire, a PVC wire, a coaxial cable, and an electrically conductive material.

13. The method of claim 1, wherein the single ultra-wideband pulse has a duration that can range between about 0.01 nanoseconds to about 1 millisecond.

14. A method of communicating data, the method comprising the steps of:
means for providing a plurality of data bits;
means for converting each of the plurality of data bits into either a 1 or a −1;
means for grouping the 1 or −1 bits into two bit groups that include a 0; and
means for transmitting the two bit groups by emitting a single ultra-wideband pulse.

15. The method of claim 14, wherein the step of converting the bits into either a 1 or a −1 comprises the steps of:
changing the plurality of data bits that are comprised of a plurality of ones (1) and a zeros (0) into a plurality of data bits that are selectively comprised of 1, 0 and −1.

16. The method of claim 14, wherein the step of grouping the 1 or −1 bits into two bit groups that include a 0 comprises the steps of:
multiplying the plurality of 1 and −1 data bits by a transformation matrix.

17. The method of claim 16, wherein the transformation matrix is selected from a group consisting of: a Walsh matrix, a Walsh-Hadamard matrix, and an orthogonal matrix.

18. The method of claim 14, wherein the step of grouping the 1 or −1 bits into two bit groups that include a 0 comprises the steps of:
using a look-up table that groups the 1 or −1 bits into two bit groups that include a 0.

19. The method of claim 14, wherein the step of transmitting the two bit groups by emitting a single ultra-wideband pulse comprises the steps of:
transmitting an ultra-wideband electromagnetic energy pulse comprising either a positive pulse or a negative pulse.

20. The method of claim 14, further including the step of:
receiving the ultra-wideband electromagnetic energy pulse comprising either a positive pulse or a negative pulse; and
assigning a data value to the ultra-wideband electromagnetic pulse based on an absence or presence of the pulse within a time bin and a polarity of the ultra-wideband electromagnetic pulse.

21. A computer program product for directing a general purpose digital computer to perform method steps to communicate data, the method steps comprising:
receiving a plurality of data bits;
converting each of the plurality of data bits into either ones or a negative ones;
grouping the one or negative one bits into bit groups that include a zero; and
transmitting the bit groups by emitting a single ultra-wideband pulse.

22. The computer program product of claim 21, wherein the step of converting the bits into either a one or a negative one comprises the steps of:
changing the plurality of data bits that are comprised of a plurality of ones and zeros into a plurality of data bits that are selectively comprised of ones, zeroes, and negative ones.

23. The computer program product of claim 21, wherein the step of grouping the one or negative one bits into bit groups that include a zero comprises the steps of:
multiplying the plurality of one and negative one data bits by a transformation matrix.

24. The computer program product of claim 23, wherein the transformation matrix is selected from a group consisting of: a Walsh matrix, a Waish-Hadamard matrix, an inverse fast Fourier transform matrix, an orthogonal matrix, a 2×2 Walsh matrix, a 4×4 Walsh matrix, and a Walsh matrix of order greater than 4.

25. The computer program product of claim 21, wherein the step of transmitting the bit groups by emitting a single ultra-wideband pulse comprises the steps of:
transmitting an ultra-wideband electromagnetic energy pulse comprising either a positive pulse or a negative pulse.

26. The computer program product of claim 21, further including the step of:
receiving the ultra-wideband electromagnetic energy pulse comprising either a positive pulse or a negative pulse; and
assigning a data value to the ultra-wideband electromagnetic pulse based on an absence or presence of the ultra-wideband electromagnetic pulse within a time bin and a polarity of the ultra-wideband electromagnetic pulse.

27. The computer program product of claim 21, wherein the step of grouping the one or negative one bits into bit groups that include a zero comprises the step of grouping the one or negative one bits into two bit groups that include a zero.

28. The computer program product of claim 21, wherein the step of grouping the one or negative one bits into bit groups that include a zero comprises the step of:

assembling the one or negative one bits data into a group selected from a group consisting of: a 2-bit group, a 4-bit group, an 8-bit group, a 16-bit group, a 32-bit group, a 64-bit group and a 128-bit group.

29. The computer program product of claim 21, wherein the step of converting each of the plurality of data bits into either a one or a negative one comprises any one of the steps of:

replacing each zero within the plurality of data bits with a negative one;

replacing each zero within the plurality of data bits with a positive one; and replacing each one within the plurality of data bits with a negative one.

30. The computer program product of claim 21, wherein the single ultra-wideband pulse is selected from a group consisting of: an electromagnetic energy ultra-wideband pulse and an impulse radio pulse.

31. The computer program product of claim 21, wherein the step of transmitting the bit groups by emitting a single ultra-wideband pulse comprises transmitting the bit groups by emitting a single ultra-wideband pulse through a media selected from a group consisting of: air, an optical fiber ribbon, a fiber optic cable, a single mode fiber optic cable, a multi mode fiber optic cable, a twisted pair wire, an unshielded twisted pair wire, a plenum wire, a PVC wire, a coaxial cable, and an electrically conductive material.

32. The computer program product of claim 21, wherein the single ultra-wideband pulse has a duration that can range between about 0.01 nanoseconds to about 1 millisecond.

* * * * *